United States Patent Office 3,256,319
Patented June 14, 1966

3,256,319
PREPARATION OF CYANFORMIC ACID ESTERS
Wilhelm Gruber, Darmstadt, Germany, assignor to Röhm & Haas G.m.b.H., Darmstadt, Germany
No Drawing. Filed Feb. 28, 1963, Ser. No. 261,884
Claims priority, application Germany, Mar. 9, 1962, R 32,250
3 Claims. (Cl. 260—478)

This invention relates to improved methods for the preparation of cyanformic acid esters of the general formula

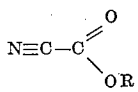

where R is an aliphatic or aromatic radical.

These compounds are also known as cyancarbonic acid esters or oxalic acid ester nitriles, and have been prepared in the prior art by the dehydration of oxalic acid ester amides with phosphorus pentoxide, by reaction of a chlorformic acid ester with a cyanide, or by hydrolysis of cyanformimido esters with aqueous acid.

The last-mentioned process gives a maximum yield of cyanformic acid methyl ester of only 44.1% when cyanformimido methyl ester is treated according to the procedure given by Nef, Ann. 287 (1895), page 277. Repeating this procedure, cyanformimido methyl ester was added to dilute hydrochloric acid with stirring. Heating of the mixture occurred, which made cooling necessary. After completion of the addition of the imido ester, stirring was continued for another thirty minutes and the cooled reaction product was extracted with ether. The cyanformic acid methyl ester isolated from the ethereal solution and dried had a boiling point of 98° C. The yield obtained is unsatisfactory. Wagner and Tollens who are believed to be the first to have commented on the reaction described, indicate that by-products such as oxamide and hydrogen cyanide are always formed together with the desired ester (Berichte 5 (1872), page 1045).

According to the present invention, it has been found that the conversion of cyanformimido esters to cyanformic acid esters by this hydrolytic method can be performed in a simple manner and with high yields by carrying out the acid hydrolysis of the ester starting product in the presence of a water-immiscible organic liquid, that is in a two phase system, with stirring or other agitation. According to the invention, isolation of the desired end product is not effected at the end of the reaction by extraction of the aqueous solution obtained, but rather the cyanformic acid ester product passes into an organic phase directly after its formation. In this way, secondary reaction tending to reduce the yield are discouraged.

The cyanformimido esters used as starting materials in the process of the invention can be prepared by reaction of an alcohol with dicyan in the presence of an alkaline material, such as a tertiary amine, as a catalyst. The preparation of cyanformimido esters of primary monohydric saturated and unsaturated aliphatic and aromatic alcohols, including partially esterfied polyhydric materials such as the monoesters of lower alkylene glycols, which esters are suitable for conversion to the corresponding cyanformic acid esters according to the present invention, is described and claimed in copending patent application Serial No. 261,820, filed on even date herewith and incorporated herein by reference.

As organic liquids suitable for forming the second phase in the present invention, ethers such as ethyl ether or dibutyl ether, and aromatic and aliphatic hydrocarbons and chlorinated hydrocarbons such as benzene, petroleum ether, trichloroethylene, chloroform, and carbon tetrachloride can be named as exemplary. The organic material is not critical, but need only be immiscible with water and an inert solvent for the cyanformic acid ester formed. Numerous materials other than those specifically mentioned are suitable and will be evident to the skilled organic chemist.

The strong acid employed for the hydrolysis of the cyanformimide ester starting material is preferably hydrochloric acid, but any mineral acid of a strength comparable with that of hydrochloric acid can be employed. The hydrolysis suitably proceeds according to the present invention at temperatures between about 0° C. and 75° C.

The cyanformic acid esters formed according to the process of the invention are useful as pesticides in view of their insecticidal and insect repellant properties, for example in combatting cochineal bugs in citrus groves and for the destruction of vermin such as the grain weevil in mills or granaries. The materials are most effective on penetration into the organism of the insect, for example by ingestion.

A better understanding of the invention and of its many advantages can be had by referring to the following specific examples, given by way of illustration.

EXAMPLE 1

Preparation of cyanformic acid methyl ester (a) Prior art process according to Nef, Ann. 287 (1895), page 277.—20 gms. of cyanformimido methyl ester were added dropwise with stirring over a period of 20 minutes at 10°–15° to dilute hydrochloric acid (27.1 gms. of 32% hydrochloric acid and 108.5 gms. water). Stirring was continued for ½ hour more and the reaction mixture was shaken with 250 ml. of ether. The organic phase was dried and after removal of the ether by distillation 8.9 gms. (44.1% of theory) of cyanformic acid methyl ester were obtained. The boiling point of the material is 98–99° C. and the index of refraction is $n_D^{20} = 1.3738$.

(b) In a two phase system according to the invention.—20 gms. of cyanformimido methyl ester were added dropwise over a period of 20 minutes to a well stirred mixture of 100 ml. of ether and 50 ml. of 17.4% hydrochloric acid at the boiling point of the ether. After ½ hour of additional stirring at about 35° C., the two phases were separated and cyanformic acid methyl ester was obtained from the organic phase in a yield of 75%.

EXAMPLE 2

Preparation of cyanformic acid allyl ester 20 gms. of cyanformimido allyl ester were added with stirring over a period of 20 minutes to a mixture of 100 ml. of petroleum ether and 50 ml. of 13.3% hydrochloric acid at 35°. Stirring was continued at this temperature for an additional hour and the product was worked up in the usual manner. The yield was 89% theory. The normal boiling point of the product was 131–133° C. and the index of refraction $n_D^{20} = 1.4081$. When the experiment was repeated using benzene as the organic phase instead of petroleum ether, the yield of cyanformic acid allyl ester amounted to 71.5% of theory.

EXAMPLE 3

Preparation of cyanformic acid n-butyl ester 20 gms. of cyanformimido-n-butyl ester were added dropwise with stirring at 35° C. over a period of 20 minutes to 100 ml. of benzene and 18.5 gms. of 32% hydrochloric acid. After the dropwise addition, the product was immediately worked up in the usual manner. The yield was 93.5% of theory, and the product had a normal boiling point of 159–160° C. and a refractive index of $n_D^{20}=1.4088$.

Other cyanformimide esters such as the ethyl, propyl, benzyl, 2-nitrobutyl, and β-chloroethyl cyanformimide esters taught in the aforementioned copending application can be treated according to the present invention by processes analogous to those in Examples 1–3 above to produce cyanformic acid esters such as syanformic acid-β-chloroethyl ester (B.P. 1 mm. Hg=36° C.;

$$n_D^{20}=1.4348)$$

cyanformic acid ethylene glycol methacrylate (B.P. 2 mm. Hg=75° C.; $n_D^{20}=1.4445$), and cyanformic acid n-hexyl ester (B.P. 43 mm. Hg=60° C.; $n_D^{20}=1.4169$).

Although specific embodiments have been shown and described herein, it is to be understood that they are illustrative, and are not to be construed as limiting on the scope and spirit of the invention.

What is claimed is:

1. In a method for the preparation of esters of primary monohydric alcohols with cyanformic acid by hydrolysis of the corresponding cyanformimide esters in the presence of an aqueous strong mineral acid, the improvement of hydrolyzing said cyanformimide esters, at a temperature between about 0° C. and 75° C. in the presence of a water-immiscible organic liquid selected from the group consisting of ethers and aromatic and aliphatic hydrocarbons and chlorinated hydrocarbons, which liquid is an inert solvent for the cyanformic acid ester reaction product.

2. A method as in claim 1 wherein said cyanformimide esters are added, with agitation, to a mixture of said organic liquid and said aqueous acid.

3. A method as in claim 1 wherein said aqueous acid is hydrochloric acid.

References Cited by the Examiner

Nef: Ann., 287, 1895, p. 277.

CHARLES B. PARKER, *Primary Examiner.*

JOSEPH P. BRUST, *Assistant Examiner.*